(12) United States Patent
Fujimoto

(10) Patent No.: US 7,333,247 B2
(45) Date of Patent: Feb. 19, 2008

(54) IMAGE CAPTURING APPARATUS

(75) Inventor: Osamu Fujimoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 957 days.

(21) Appl. No.: 10/434,650

(22) Filed: May 9, 2003

(65) Prior Publication Data
US 2003/0214683 A1 Nov. 20, 2003

(30) Foreign Application Priority Data
May 14, 2002 (JP) ............................. 2002-138693

(51) Int. Cl.
*H04N 1/04* (2006.01)
(52) U.S. Cl. .................... 358/474; 358/1.15; 358/1.18; 358/1.3; 358/1.12; 358/1.16; 358/462; 358/312
(58) Field of Classification Search ................ 358/474, 358/1.9, 1.15, 1.18, 405; 382/312
See application file for complete search history.

(56) References Cited
U.S. PATENT DOCUMENTS

| | | | | |
|---|---|---|---|---|
| 6,333,795 B1 * | 12/2001 | Kaji | ............................. | 358/474 |
| 6,760,131 B2 * | 7/2004 | Kaji | ............................. | 358/474 |
| 6,856,423 B2 * | 2/2005 | Anderson et al. | ........... | 358/1.18 |
| 6,982,806 B2 * | 1/2006 | Yoshida | ...................... | 358/1.15 |
| 7,064,863 B2 * | 6/2006 | Fukuda et al. | ................ | 358/1.9 |
| 7,085,019 B2 * | 8/2006 | Yoshida et al. | .............. | 358/405 |
| 7,123,385 B2 * | 10/2006 | Oteki et al. | .................. | 358/474 |

FOREIGN PATENT DOCUMENTS

| | | | |
|---|---|---|---|
| JP | 10-178519 | | 6/1998 |
| JP | 2002-229391 | * | 5/2001 |
| JP | 2001-251483 | | 9/2001 |
| JP | 2002-229391 | | 8/2002 |

* cited by examiner

*Primary Examiner*—Douglas Q. Tran
*Assistant Examiner*—Satwant Singh
(74) *Attorney, Agent, or Firm*—Renner, Otto, Boisselle & Sklar, LLP

(57) ABSTRACT

When in single-sided capturing mode(s), because image(s) of both sides of first original sheet(s) is or are captured by first and second capturing components 10, 23, front side(s) of the original(s) being identified based on the image(s) of both sides of the original(s), and either first or second capturing components 10, 23 being used to capture only image(s) of front side(s) of second and any subsequent original sheet(s), front side(s) of respective original(s) may be captured regardless of whether front side(s) of respective original(s) in original tray 22 face upward or downward. Furthermore, because during capturing of second and any subsequent original sheet(s), capturing of image(s) of back side(s) of original(s) by whichever of first and second capturing components 10, 23 is or are not engaged in capturing is aborted, lamp(s) for exposure belonging to this or these capturing components being turned OFF, reduction in power consumption is permitted.

10 Claims, 3 Drawing Sheets

IMAGE CAPTURING APPARATUS

BACKGROUND OF INVENTION

1. Field of Invention

The present invention pertains to an image capturing apparatus capable of capturing images of both sides of originals.

2. Conventional Art

As in known, image capturing apparatuses of this type are capable of using two capturing means to capture both sides of originals more or less simultaneously as originals are taken up from a tray and are transported, outputting images of both sides of originals captured by both capturing means when in double-sided capturing mode, or outputting images of one side of originals captured by one of the capturing means when in single-sided capturing mode (see Japanese Patent Application Publication Kokai No. H10-178519 (1998), Japanese Patent Application Publication Kokai No. H11-136442 (1999), and Japanese Patent Application Publication Kokai No. 2001-77960).

Originals in the tray may be transported as they are or may be transported after they have been flipped such that front and back are reversed, such operations for transport of originals being established as appropriate for each particular model of image capturing apparatus. Furthermore, the downward-facing side of the originals is typically captured as the originals are being transported. For this reason, during single-sided capturing mode, in placing originals in the tray, whether the side to be captured should face upward or downward is a function of whether originals in the tray are transported without flipping or whether they are transported after first being flipped such that front and back are reversed. When originals in the tray are transported without flipping, the originals should be placed in the tray such that the side to be captured faces downward, but when front and back are flipped prior to transport, the originals should be placed in the tray such that the side to be captured faces upward. Furthermore, it is often the case that indication is provided as to whether originals should be placed in the tray face up or face down.

However, because, in placing the originals in the tray, the direction in which the side to be captured should face may vary randomly from one model of image capturing apparatus to another, there have been cases where any indication which may have existed as to the direction in which originals should face in the tray was overlooked, and as a result of confusion over whether the side of the originals to be captured should face upward or face downward, originals were placed in the tray such that the originals faced in the wrong direction, resulting in a situation in which the blank sides of the originals were captured. Or even where the mistake was discovered prior to capturing, it would still have been necessary to rectify placement of the originals.

Therefore, in the aforementioned image capturing apparatuses, during single-sided capturing mode, the two capturing means might be used to capture both sides of the originals, the side of the originals to be captured might be identified based on the results of capturing by both capturing means, a capturing means capable of capturing the side to be captured might be selected, and images of originals captured by the selected capturing means might be output, as a result of which operations would be accomplished without the need to rectify placement of originals.

Or input operations on the part of the user might be used to designate either the upward-facing or the downward-facing side of the originals in the tray, a capturing means capable of capturing the designated side of the originals might be selected, and images of originals captured by the selected capturing means might be output, as a result of which operations would be accomplished without the need to rectify placement of originals However, in the aforementioned conventional image capturing apparatuses, when in single-sided capturing mode, where two capturing means have been used to capture both sides of the originals, this has meant that both capturing means would have been made to operate all of the time, which has been extremely uneconomical due to the high power consumption. Furthermore, the processing circuits for processing of respective images captured by respective capturing means have had to carry out processing of images depicting blank sides of originals or the like, increasing the amount of wasted processing, increasing load, increasing processing time, and contributing to reduced life.

Furthermore, when a plurality of originals are placed in the tray, the respective originals are arranged such that all of the original face the same way, the side to be captured being made to face either upward or downward. Since on rare occasions the sides of the originals to be captured do not all face the same way, if, for each original, the side of the original to be captured is identified as previously described based on the results of capturing by the respective capturing means and a capturing means capable of capturing the side to be captured is selected, it will be possible to compensate for such errors. However, considering the power consumption, load on processing circuits, increased processing time, and reduced life that would result from causing the respective capturing means to operate all the time for the sake of a rare error, this does not appear to be preferred after all.

SUMMARY OF INVENTION

The present invention was therefore conceived in light of the foregoing conventional problems, it being an object thereof to provide an image capturing apparatus capable of determining, during single-sided capturing mode, whether side(s) which should be captured of original(s) in tray(s) face upward and/or downward, and capable of reducing wasteful operations at capturing means and/or processing circuit(s) while permitting capturing of side(s) of original(s) which should be captured.

In order to solve one or more of the foregoing problems, one or more embodiments of the present invention, in the context of an image capturing apparatus, equipped with one or more first and one or more second capturing means capable of capturing both sides of one or more originals, which is capable of using at least one of the first and at least one of the second capturing means to selectively execute operations either in one or more single-sided capture modes wherein one side of each of one or more originals is captured or in one or more double-sided capture modes wherein both sides of each of one or more originals are captured, may be equipped with one or more control means capable of causing, when executing operations pursuant to selection of at least one of the single-sided capture mode or modes, at least one of the first and at least one of the second capturing means to capture at least a portion of both sides of at least a first original sheet; at least one of the first or at least one of the second capturing means being selected based on the results of the capturing which was performed by at least one of the first and at least one of the second capturing means; and whichever of the first and second capturing means was selected being used to capture only one side of the next and any subsequent original sheets.

In one or more embodiments of the present invention constituted in this fashion, when operations are executed pursuant to selection of at least one of the single-sided capture mode or modes, at least one of the first and at least one of the second capturing means may capture at least a portion of both sides of at least a first original sheet, and at least one of the first or at least one of the second capturing means may be selected based on the results of the capturing which was performed by at least one of the first and at least one of the second capturing means. For example, if one side of a first original sheet contains images, characters, and/or the like printed thereon and the other side thereof is completely blank, then, based on the results of the capturing performed by the first and second capturing means, whichever of the first and second capturing means it was that captured the side of the first original sheet which contained images, characters, and/or the like printed thereon could be selected. Furthermore, for the second and any subsequent original sheets, whichever of the first and second capturing means was selected could also be used to perform capturing of the same side as at the first original sheet. That is, since when placing a plurality of originals in the tray, the respective originals may be arranged such that the side thereof to be captured always faces either upward or downward, the side of the first original sheet which should be captured may be selected based on the results of capturing of the first sheet by the first and second capturing means, and for the second and any subsequent original sheets, either at least one of the first or at least one of the second capturing means may be used to capture the same side as at the first original sheet. This permits the side of the respective originals which should be captured to be captured regardless of whether the originals are placed in the tray such that the side to be captured faces upward or faces downward. Furthermore, this permits operations to be accomplished without confusion as to whether the side of originals to be captured should face upward or face downward and without the need to rectify placement of originals. Moreover, because capturing by whichever of the first and second means was not selected is stopped when the second and any subsequent original sheets are captured by whichever of the first and second means was selected, power consumption can be reduced, load on processing circuit(s) which carry out processing of images can be reduced, processing time can be reduced, and shortening of life can be avoided.

Furthermore, in one or more embodiments of the present invention, supply of power to whichever of the first and second capturing means was not selected may be turned OFF. Alternatively or in addition thereto, at least one of the first and at least one of the second capturing means may each be equipped with one or more light sources for irradiating one or more originals with light, and supply of power to at least one of the light source or sources of whichever of the first and second capturing means was not selected may be turned OFF.

By thus turning OFF supply of power to whichever of the first and second capturing means was not selected, reduction in power consumption is made possible.

In addition, in one or more embodiments of the present invention, such turning OFF of supply of power may occur during the period from completion of capturing of at least a portion of both sides of at least the first original sheet to the start of capturing of one side of the next and any subsequent original sheets.

By turning OFF supply of power during such period, even where this turning OFF of supply of power might cause fluctuation in voltage or the like, producing variation in illuminance from light source(s) which irradiated original(s) with light, capturing of the next and any subsequent original sheets will not suffer any adverse effect as a result thereof.

Furthermore, in one or more embodiments of the present invention, correction of capturing by at least one of the first and at least one of the second capturing means may be carried out either when operations are being performed by at least one of the first and at least one of the second capturing means or when operations are being performed by at least one of the first or at least one of the second capturing means.

As previously described, during single-sided capturing mode, at least one of the first and at least one of the second capturing means may be made to capture at least a portion of both sides of a first original sheet, and either at least one of the first or at least one of the second capturing means may be made to capture one side of the next and any subsequent original sheets. This being the case, both sides of the first original sheet being irradiated by light from the two light sources or sets of light sources belonging to at least one of the first and at least one of the second capturing means, these two sides of the first original sheet—the original having some nonzero translucency—will tend to be brighter, while the single side of the second and any subsequent original sheets being irradiated by light belonging to only the one light source or set of light sources of either at least one of the first or at least one of the second capturing means, these single side(s) of the original(s) will tend to be darker. Correction of capturing by at least one of the first and at least one of the second capturing means may therefore be carried out either when operations are being performed by at least one of the first and at least one of the second capturing means or when operations are being performed by at least one of the first or at least one of the second capturing means, permitting brightness(es) of captured image(s) of original(s) to be adjusted, permitting brightness(es) of image(s) of at least the first original sheet(s) and brightness(es) of image(s) of the next and any subsequent original sheets to be made uniform, and permitting prevention of reduction in image quality.

Moreover, in one or more embodiments of the present invention, when operations are being performed by at least one of the first or at least one of the second capturing means, correction of capturing by whichever of the first and second means is performing operations may be carried out.

When operations are being performed by at least one of the first or at least one of the second capturing means, by thus carrying out correction of capturing by whichever of the first and second means is performing operations, because it is sufficient to carry out correction of capturing by only one of the capturing means or sets of capturing means, processing in connection with such correction is simplified.

Furthermore, in one or more embodiments of the present invention, at least one of the first and at least one of the second capturing means may each be equipped with one or more light sources for irradiating one or more originals with light, and the correction of capturing by at least one of the first and at least one of the second capturing means may be accomplished at least partially through correction of one or more amounts of light from at least one of the light source or sources of each.

By thus correcting amount(s) of light from light source(s) of first and second capturing means, it is possible to adjust brightness(es) of image(s) of original(s).

Moreover, in one or more embodiments of the present invention, the correction of capturing by at least one of the first and at least one of the second capturing means may be accomplished at least partially through correction of one or more images of one or more originals captured by at least one of the first and at least one of the second capturing means.

By thus correcting image(s) of captured original(s), it is possible to adjust brightness(es) of image(s) of original(s).

Furthermore, one or more embodiments of the present invention may be equipped with one or more first and one or more second storage means capable of storing one or more images of one or more originals, at least one image of at least one original captured by at least one of the first capturing means being stored in at least one of the first storage means and at least one image of at least one original captured by at least one of the second capturing means being stored in at least one of the second storage means when in at least one of the double-sided capture mode or modes, and at least one of the first and at least one of the second storage means being used to store at least one image of at least one original captured by either at least one of the first or at least one of the second capturing means when in at least one of the single-sided capture mode or modes.

By thus assigning first and second storage means to first and second capturing means when in double-sided capturing mode(s), and assigning first and second storage means to either first or second capturing means when in single-sided capturing mode(s), it is possible to double image storage capacity when in single-sided capturing mode.

In addition, one or more embodiments of the present invention may be equipped with one or more storage means capable of storing one or more images of a plurality of originals, at least one of the respective image or images of originals captured by either at least one of the first or at least one of the second capturing means being sequentially stored in at least one of the storage means when in at least one of the single-sided capture mode or modes; and when retrieving at least one of said respective image or images of originals from at least one of the storage means, an order of retrieval of said respective image or images of originals being capable of being switched between an order in which said respective image or images of originals were stored and the reverse of the order in which said respective image or images of originals were stored, in accordance with whether it was at least one of the first or at least one of the second capturing means that captured same.

Here, the case where a plurality of originals are placed face upward and the case where a plurality of originals are placed face downward will be examined. When respective originals are placed face downward, one of the capturing means or sets of capturing means will capture images from the respective originals. Furthermore, assuming that the respective originals are consecutively taken up from the tray and transported starting with the topmost thereamong, the respective originals will be consecutively taken up from same starting with the last page thereamong, images of respective originals being captured by one of the capturing means or sets of capturing means and being sequentially stored at storage means. In such a case, retrieving images of respective originals in an order which is the reverse of the order in which said images of respective originals were stored will make it possible for the images of respective originals to be retrieved and output starting with the first page thereamong. Furthermore, when respective originals are placed face upward, the other of the capturing means or sets of capturing means will capture images from the respective originals. Furthermore, assuming as before that the respective originals are consecutively taken up from the tray and transported starting with the topmost thereamong, the respective originals will be consecutively taken up from same starting with the first page thereamong, images of respective originals being captured by the other of the capturing means or sets of capturing means and being sequentially stored at storage means. In such a case, retrieving images of respective originals in the order in which said images of respective originals were stored will make it possible for the images of respective originals to be retrieved and output starting with the first page thereamong. Moreover, where respective originals are consecutively taken up from the tray and transported starting with the topmost thereamong, it is sufficient to reverse the order in which respective originals are retrieved depending upon whether respective originals are placed face upward or face downward.

DESCRIPTION OF PREFERRED EMBODIMENTS

Below, embodiments of the present invention are described in detail with reference to the attached drawings.

Figure 1:
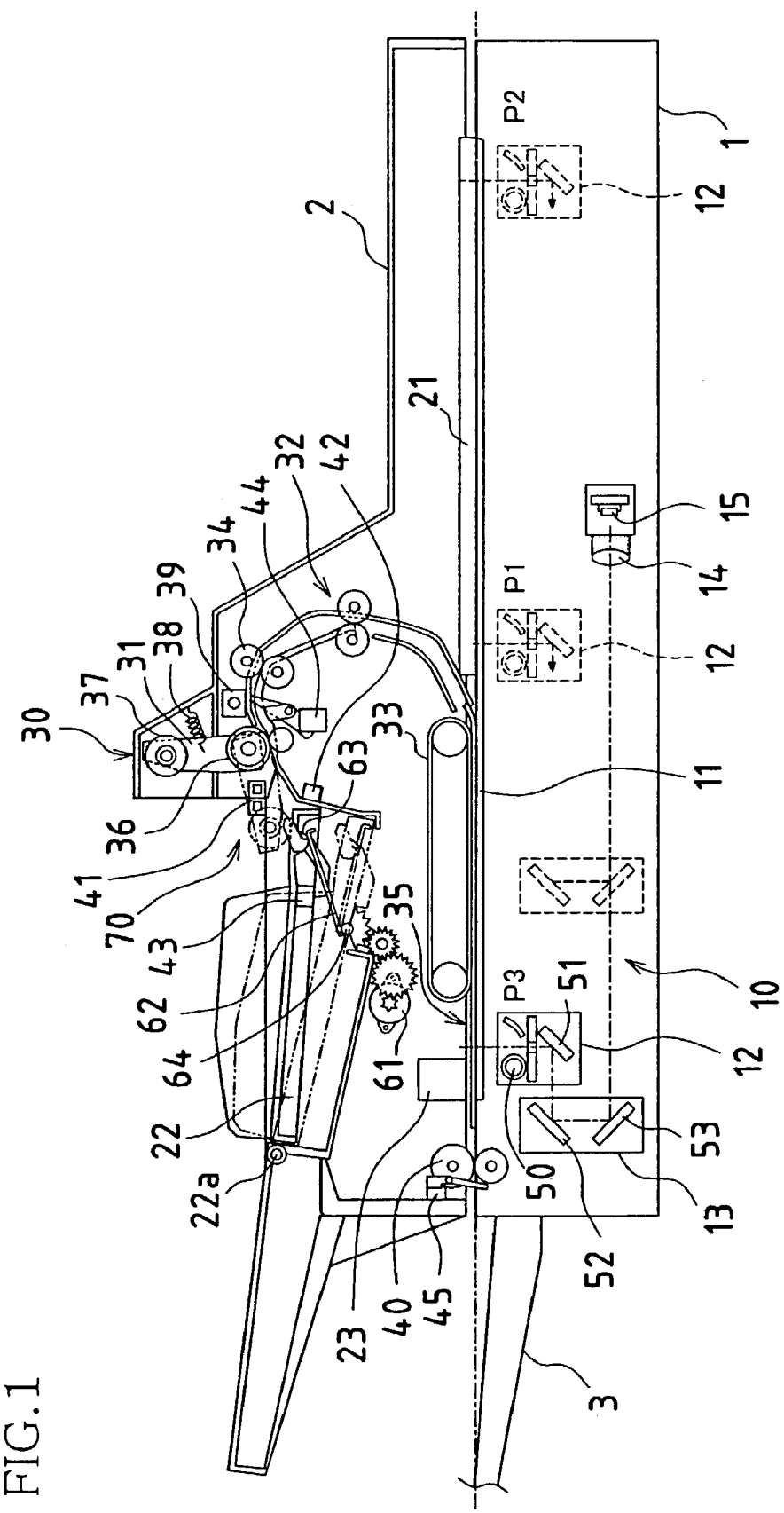
FIG. 1 is a side view showing one embodiment of the image capturing apparatus of the present invention.

FIG. 1 is a side view showing one embodiment of the image capturing apparatus of the present invention. The image capturing apparatus of the present embodiment is equipped with lower housing 1 provided with first capturing component 10, upper housing 2 provided with second capturing component 23, and discharge tray 3 in which originals subjected to capturing by at least one of first and second capturing components 10, 23 are received and accumulate.

Upper housing 2, a hinge (not shown) at the far side thereof being pivotably supported by one side of lower housing 1, can be opened by raising or lowering the near portion thereof. When upper housing 2 is opened, glass platen 11 of lower housing 1 is exposed. Original backpressure pad 21, being a white pad, presses on an original, holding same in intimate contact against glass platen 11, when upper housing 2 is closed.

First capturing component 10 of lower housing 1 is equipped with glass platen 11, first scanning unit 12, second scanning unit 13, imaging lens 14, and CCD (Charge Coupled Device) 15. First scanning unit 12, being equipped with exposing lamp (a halogen lamp, xenon lamp, fluorescent lamp, or the like) 50 and first reflecting mirror 51, causes the original on glass platen 11 to be exposed by exposing lamp 50 as it is moved parallel to glass platen 11 in a direction from first position P1 toward second position P2 at a constant velocity V for a distance corresponding to the size of the original as detected by a sensor (not shown), the light reflected therefrom being reflected by first reflecting mirror 51 and being directed to second scanning unit 13, as a result of which an image of the bottom of the original is scanned in the cross-scan direction. Second scanning unit 13 is equipped with second and third reflecting mirrors 52, 53, and as it tracks first scanning unit 12 while moving at velocity V/2 it causes light reflected from the original to be reflected by second and third reflecting mirrors 52, 53 and to be directed toward lens 14. Lens 14 causes light reflected from the original to be collected onto CCD 15, and an image of the bottom of the original is formed on CCD 15. CCD 15 repeatedly scans the image of the original in the scan direction, outputting one scan-direction line worth of image signal each time it does so. This image signal being an analog signal, it is converted into digital image data by an image processing unit as is described below, and the image data is then stored in image memory.

First and second scanning units 12, 13 are respectively provided with pulleys (not shown), a wire (not shown) being made to span the distance between the two pulleys, and this wire being driven by a stepper motor, so that first and second scanning units 12, 13 are made to move in synchronous fashion.

Note that when the apparatus is in its standby state, first scanning unit 12 is positioned at a home position (not shown) located at a point intermediate between first position P1 and third position P3.

Furthermore, instead of first and second scanning units 12, 13, there is no objection to causing the reducing image-capturing optical system represented by the integral assembly comprising exposing lamp(s), lens(es), CCD(s), and the like or the unit magnification image-capturing optical system subassembly to scan at scan velocity V.

First capturing component 10 is capable of capturing an image of the bottom of not only a stationary original but also of an original which is transported by original transport component 70. In such a case, first scanning unit 12 of first capturing component 10 is moved to and positioned at third position P3, and second scanning unit 13 is positioned at a prescribed location. With the apparatus in this state, an original is taken up from original tray 22, and the original is made to pass over glass platen 11 as it is transported to discharge tray 3. During such transport, exposing lamp 50 of first scanning unit 12 irradiates the bottom of the original by way of interposing glass platen 11, light reflected from the original is directed toward lens 14 by the respective reflecting mirrors of the first and second scanning units, lens 14 causes light reflected from the original to be collected onto CCD 15, and an image of the bottom of the original is formed on CCD 15, as a result of which an image of the bottom of the original is captured.

Moreover, during transport of the original by original transport component 70, second capturing component 23 of upper housing 2 is capable of capturing an image of the top of this original. This second capturing component 23 is arranged above glass platen 11 and is equipped with an exposing lamp (LED array, fluorescent lamp, or the like) which irradiates the top surface of the original, a SELFOC (Registered Trademark) lens array which collects light reflected from the original pixel-by-pixel, and a contact image sensor (CIS) or the like which photoelectrically converts light reflected from the original that it receives by way of the SELFOC (Registered Trademark) lens array and which outputs an analog image signal.

Original transport component 70 is equipped with original tray 22 for loading of originals; original pickup component 30 which consecutively takes up respective originals from original tray 22, sending them one sheet at a time to first original transport path 32; first original transport path 32 which is provided with respective transport rollers 34 which transport originals; second original transport path 35 which is provided with belt transport component 33 which transports originals over glass platen 11 and toward second capturing component 23; respective discharge rollers 40 which discharge originals to discharge tray 3; and so forth.

Original tray 22, into which on the order of 100 sheets of originals can be loaded, is provided with original sensor 43 comprising optical sensor(s) and actuator(s), original(s) being detected by this original sensor 43. Elevator plate 62 is pivotably supported by spindle 64, rotation of an output shaft of elevator motor 61 being transmitted to spindle 64 by way of a gear subassembly, causing elevator plate 62 to rotate and move, lifting or lowering the right end of elevator plate 62. Original tray 22 is pivotably supported by spindle 22a, rib 63 at the right end thereof resting on the right end of elevator plate 62, the right end of original tray 22 being lifted and lowered in accompaniment to lifting and lowering of the right end of elevator plate 62.

Original tray sensor 42, being a reflective-type sensor or the like, is capable of detecting a standby position of original tray 22. Elevator motor 61 is driven and controlled based on results of output from this original tray sensor 42, causing original tray 22 to move to its standby position. The standby position of original tray 22, being set in advance by service staff, administrative personnel, or the like, is set to a location from which originals can be easily taken up by original pickup component 30 when the number of original sheets in most frequent use are in original tray 22. Because the number of sheets in most frequent use is typically somewhere between one sheet and several sheets, the standby position of original tray 22 might be set to its highest location.

Original pickup component 30 is equipped with pickup roller 37 which takes up originals from original tray 22; separating roller 36 which separates originals one sheet at a time, sending same to first original transport path 32; and so forth. Pickup roller 37 is pivotably supported by one end of arm 31, the other end of this arm 31 being pivotably supported by a rotary shaft belonging to separating roller 36. Furthermore, drive component 39, comprising a solenoid or the like, is linked to arm 31, this arm 31 being made to rotate and move by means of drive component 39, allowing pickup roller 37 to press against originals in original tray 22, while the height of pickup roller 37 is detected by pickup roller position sensor 41. Separating roller 36 is installed in such fashion that it abuts a friction pad and/or roller whose rotational movement is controlled by a torque limiter.

When the apparatus is in its standby state, arm 31 is pulled upward by a coil spring or other such restoring-force-delivering component 38, lifting pickup roller 37 and releasing original tray 22, and facilitating placement of originals in original tray 22. When originals are placed in original tray 22, drive component 39 is driven and controlled, causing pickup roller 37 to press against the originals in original tray 22, making it possible for originals to be taken up therefrom by pickup roller 37. The respective originals in original tray 22 are consecutively taken up therefrom by pickup roller 37, and are separated one sheet at a time by separating roller 36 before being transported.

First original transport path 32 is equipped with a curved transport guide, respective transport rollers 34, feed sensor 44 for detecting the timing with which the original is transported, and so forth. Upon receiving an original from original tray 22, this first original transport path 32 transports the original by way of the transport guide, directing it toward second original transport path 35.

Second original transport path 35, equipped with belt transport component 33 wherein an endless belt comprising urethane or the like is suspended between a drive roller and an idler roller, serves as transport guide, guiding originals between belt transport component 33 and glass platen 11. A location some ten or so millimeters removed from and downstream of belt transport component 33 represents the station at which originals are captured by first and second capturing components 10, 23. This second original transport path 35 directs originals to respective discharge rollers 40 by way of this capturing station. Respective discharge rollers 40 discharge originals to discharge tray 3. Discharge sensor 45 detects whether originals have been discharged into discharge tray 3.

With an image capturing apparatus constituted in this fashion, selection may be made among a stationary capturing mode wherein an original is held stationary and an image of the original is captured by first capturing component 10, a single-sided capturing mode wherein an image of an original is captured by second capturing component 23 as the original is being transported, and a double-sided capturing mode wherein images of both sides of an original are captured by first and second capturing components 10, 23 as the original is being transported.

When in stationary capturing mode, upper housing 2 is opened and an original is placed on glass platen 11, following which upper housing 2 is closed. At first capturing component 10, responsive to instructions from a capturing controller, described below, first scanning unit 12 is moved from its home position to first position P1, first scanning unit 12 is furthermore moved in a direction from first position P1 toward second position P2 for a distance corresponding to the size of the original, the bottom of the original on glass platen 11 is irradiated as second scanning unit 13 is made to track the movement of first scanning unit 12, and an image of the bottom of the original is captured by CCD 15.

When in single-sided capturing mode, original(s) are placed in original tray 22. Responsive to instructions from a capturing controller, described below, first scanning unit 12 of first capturing component 10 is moved from its home position to third position P3, where it is positioned, and second scanning unit 13 is positioned at a prescribed location. As originals in original tray 22 are thereafter taken up therefrom and are transported by original transport component 70, the originals are directed toward a point between first and second capturing components 10, 23, and the originals are furthermore discharged into discharge tray 3. Moreover, the image of one of the two sides of the original(s) captured by first and second capturing components 10, 23 is selected and is output.

When in double-sided capturing mode, original(s) are also placed in original tray 22 as described above. Responsive to instructions from a capturing controller, described below, first scanning unit 12 of first capturing component 10 is moved from its home position to third position P3, where it is positioned, and second scanning unit 13 is positioned at a prescribed location. As originals in original tray 22 are thereafter taken up therefrom and are transported by original transport component 70, the originals are directed toward a point between first and second capturing components 10, 23, and the originals are furthermore discharged into discharge tray 3. Moreover, the images of both sides of the original(s) captured by first and second capturing components 10, 23 are output.

Figure 2:
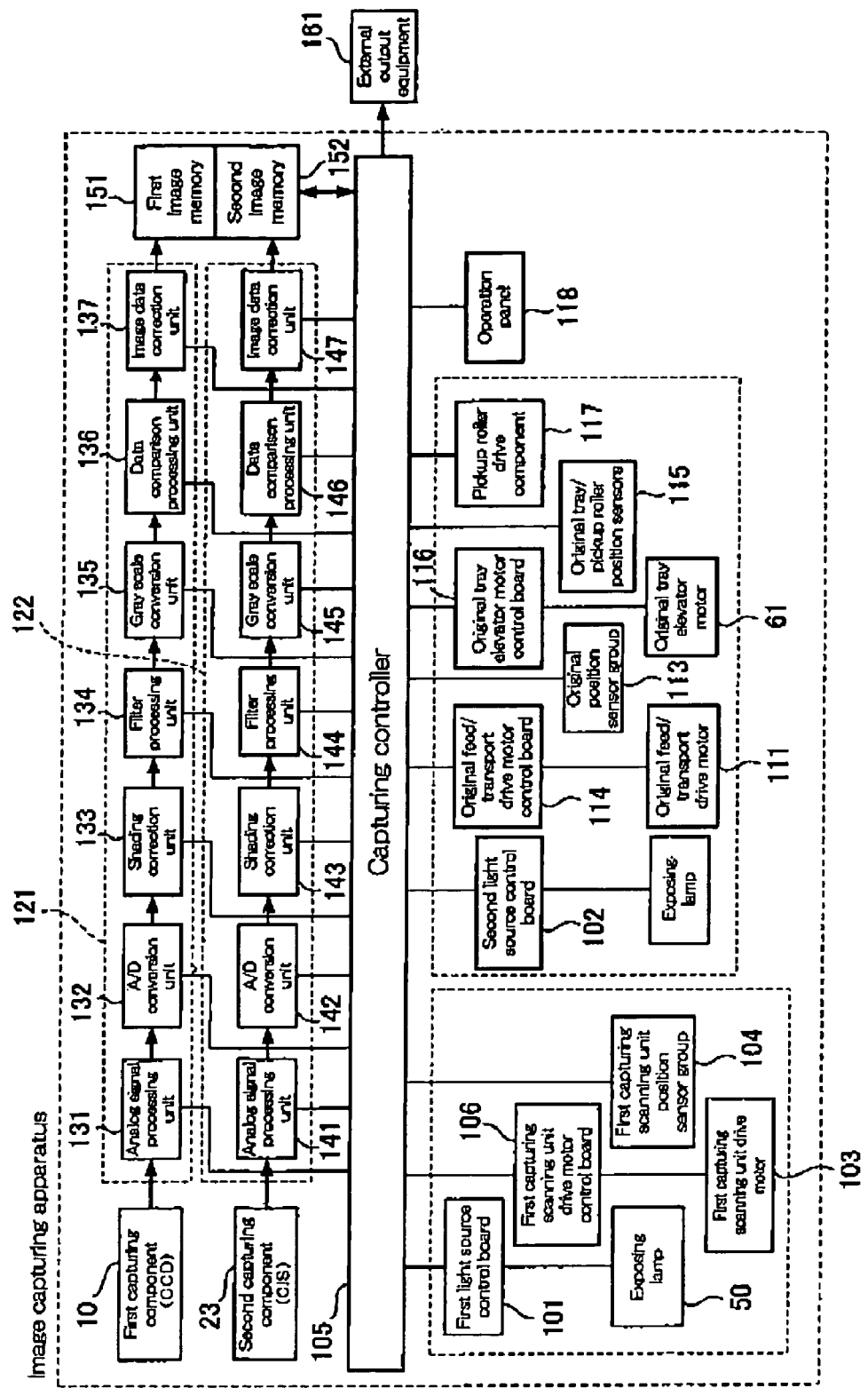
FIG. 2 is a block diagram showing the constitution of the image capturing apparatus of the present embodiment.

FIG. 2 is a block diagram showing the constitution of the image capturing apparatus of the present embodiment.

At FIG. 2, first light source control board 101 turns ON and OFF the exposing lamp 50 of first capturing component 10. Furthermore, second light source control board 102 turns ON and OFF the exposing lamp of second capturing component 23.

First capturing scanning unit drive motor 103 serves as drive source for moving first and second scanning units 12, 13. First capturing scanning unit position sensor group 104 detects the position of first scanning unit 12 of first capturing component 10 when it is positioned at any of first through third positions P1 through P3, communicating the detected position to capturing controller 105. Capturing controller 105 controls driving of first capturing scanning unit drive motor 103 by way of first capturing scanning unit drive motor control board 106, causing first capturing scanning unit drive motor 103 to rotate in forward or reverse direction and causing first and second scanning units 12, 13 to move as it detects the position of first scanning unit 12 based on first through third positions P1 through P3 of first scanning unit 12 and the rotational angle of first capturing scanning unit drive motor 103.

Original feed/transport drive motor 111 serves as drive source for rotating respective transport rollers 34, belt transport component 33, and respective discharge rollers 40. Original detection sensor group 113, comprising original sensor 43, feed sensor 44, and discharge sensor 45, detects the position of the original and communicates same to capturing controller 105. Capturing controller 105 controls driving of original feed/transport drive motor 111 by way of original feed/transport drive motor control board 114 in correspondence to original timing as detected by original detection sensor group 113 and elapsed time as calculated by an internal timer, causing the original to be transported with accurate timing.

Original tray/pickup roller position detection sensor group 115 comprises pickup roller position sensor 41 and original tray sensor 42. When pickup roller position sensor 41 has detected that pickup roller 37 has been raised, capturing controller 105 controls driving of original tray elevator motor 61 by way of original tray elevator motor control board 116 based on output of detection by original tray sensor 42, causing original tray 22 to move to its standby position. Furthermore, capturing controller 105 causes rotation of pickup roller 37 by way of suction pickup drive component 117, causing an original to be taken up from original tray 22.

Operation panel 118 is operated by a user and delivers instructions to capturing controller 105 with respect to image contrast, enlargement or reduction percentage, and so forth.

Moreover, upon output of image signal(s) from CCD 15 of first capturing component 10, this or these image signal(s) is or are applied to first image processing unit 121. Furthermore, upon output of image signal(s) from the contact image sensor of second capturing component 23, this or these image signal(s) is or are applied to second image processing unit 122. Because the photoelectric conversion efficiencies, output levels, and so forth of CCD 15 and the contact image sensor are mutually different, they are each provided with their own dedicated first or second image processing unit 121, 122.

First and second image processing units 121, 122, being of similar construction, are equipped with respective analog signal processing units 131, 141; respective A/D conversion units 132, 142; respective shading correction units 133, 143; respective filter processing units 134, 144; respective gray scale conversion units 135, 145; respective data comparison processing units 136, 146; and respective image data correction units 137, 147.

Respective analog signal processing units 131, 141 perform level conversion processing, sample-and-hold processing, and signal amplification processing on the respective image signals received from CCD 15 and the contact image sensor, and thereafter output these image signals.

Respective A/D conversion units 132, 142 perform analog-digital conversion on the respective image signals received from respective analog signal processing units 131, 141, and output respective sets of image data.

Respective shading correction units 133, 143 perform black reproduction processing and white reproduction processing on respective sets of image data received from respective A/D conversion units 132, 142, and thereafter output the processed sets of image data. During black reproduction processing, processing performed on image data is such that dark output produced by CCD 15 (or contact image sensor) is subtracted from output produced by CCD 15 (or contact image sensor) during capturing of image(s), eliminating the effect of dark output on image data. During white reproduction processing, processing performed on image data is such that, for every pixel, output produced by CCD 15 (or contact image sensor) during capturing of image(s) is normalized based on output produced by CCD 15 (or contact image sensor) during capturing of a white reference, correcting for nonuniformities in amount of light, the effects of optical components, and variation among the respective photoelectric conversion elements responsible for capturing of each pixel.

Respective filter processing units 134, 144 perform spatial filtering processing on respective sets of image data received from respective shading correction units 133, 143, and thereafter output the processed sets of image data. More specifically, processing performed on image data is such that the high-frequency component in the image is accentuated, correcting image blurriness. Because of deterioration in the MTF (Modulation Transfer Function) applicable to respective signals from CCD 15 and the contact image sensor due to lenses, mirrors, and/or other optical components, sizes of apertures applicable to respective photoelectric conversion elements responsible for capturing of respective pixels, afterimages and/or transfer efficiencies associated with CCD 15 and the contact image sensor, integrative effects due to physical scanning, and so forth, respective filter processing units 134, 144 compensate for such deterioration of the MTF applicable to said respective image signals.

Respective gray scale conversion units 135, 145 perform gray scale conversion processing on respective sets of image data received from respective filter processing units 134, 144, referring to preestablished lookup table(s) for data conversion, and thereafter output the processed sets of image data.

If, for example, the image is to be converted into a binary image, image data might be converted into binary data. Furthermore, in the case of a multivalued image, gray scale conversion processing might be performed on image data based on preestablished gray scale characteristics, improving image quality.

Respective data comparison processing units 136, 146 compare respective sets of image data received from respective gray scale conversion units 135, 145 with preestablished reference image data and determine which of the respective images represented by these sets of image data corresponds to the front and which to the back of the original(s). If, for example, the image represented by one of the sets of image data is completely blank, it might be determined that this image corresponds to the back of the original, and that the image represented by the other of the sets of image data corresponds to the front of the original, and the results of this determination might be communicated to capturing controller 105. Or if the respective images represented by both of the respective sets of image data are completely blank, this fact might be communicated to capturing controller 105. Capturing controller 105 controls first and second image processing units 121, 122 based on the relationship between respective images and the front and back of the original corresponding thereto. Or if respective images representing front and back of original are both completely blank, or if neither is blank, a message such as "Unable to proceed with capturing of originals" might be displayed at a display screen (not shown).

Image data correction units 137, 147, upon receiving respective sets of image data from respective data comparison processing units 136, 146, correct the brightness of the respective images represented by these sets of image data. Note that image data correction units 137, 147 operate only when so directed by capturing controller 105.

Image data thus processed by first image processing unit 121 is transferred to first image memory 151 and is stored at first image memory 151 in units one page in size. Similarly, image data processed by second image processing unit 122 is transferred to second image memory 152 and is stored at second image memory 152 in units one page in size.

Furthermore, in an image capturing apparatus constituted in such fashion, when in the aforementioned single-sided capturing mode, images of both sides of a first original sheet are captured by first and second capturing components 10, 23, whichever of first and second capturing components 10, 23 it was that captured the front of the first original sheet being selected based on the results of capturing performed by first and second capturing components 10, 23, and whichever it was of first and second capturing components 10, 23 that was selected is made to operate during capturing of the second and any subsequent original sheets, but the exposing lamp of the other, which was not selected, is turned OFF. This permits the fronts of respective originals to be captured regardless of whether respective originals are placed face upward or face downward in original tray 22, and moreover, during capturing of the second and any subsequent originals, permits the exposing lamp that would otherwise have illuminated the backs of the originals to be turned OFF, permitting reduction in power consumption.

Figure 3:
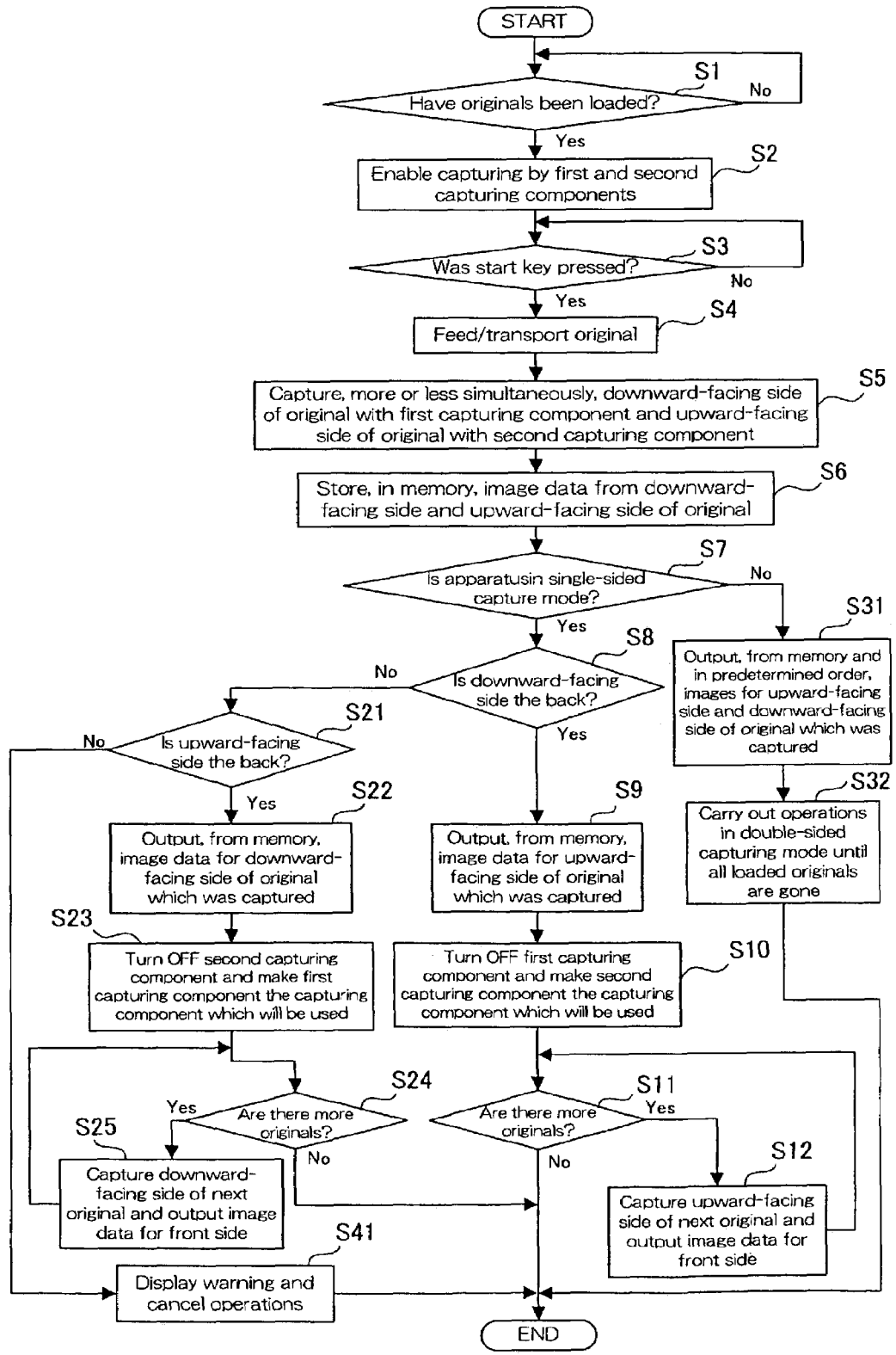
FIG. 3 is a flowchart showing processing steps carried out by the image capturing apparatus of the present embodiment.

Next, processing steps taking place when in single-sided capturing mode are described in further detail following the flowchart of FIG. 3.

First, capturing controller 105 awaits placement of originals in original tray 22, which it detects based on output of detection by original sensor 43 ("No" at step S1). Furthermore, upon placement of original(s) in original tray 22 ("Yes" at step S1), capturing controller 105 causes first scanning unit 12 of first capturing component 10 to move to and take up a position at third position P3, causes second scanning unit 13 to take up a position at a prescribed location, and turns ON the exposing lamp 50 of first capturing component 10 as well as the exposing lamp of second capturing component 23, making the apparatus capable of capturing originals (step S2). Furthermore, at such time, by carrying out input operation(s) at operation panel 118, a user directs the apparatus to operate either in single-sided capturing mode or double-sided capturing mode. Upon being directed to operate in single-sided capturing mode, capturing controller 105 directs respective data comparison processing units 136, 146 of first and second image processing units 121, 122 to identify the front and back of the first original sheet.

Note that when the apparatus is directed to operate in double-sided capturing mode, the respective data comparison processing units 136, 146 are not directed to identify the front and back of the first original sheet. Furthermore, operations may not be executed in stationary capturing mode when originals have been placed in original tray 22.

Capturing controller 105 thereafter awaits instruction to begin capturing of original(s) ("No" at step S3), and upon receipt of instruction to begin capturing of original(s) as a result of a start key (not shown) having been pressed ("Yes" at step S3), causes pickup roller 37 to rotate by way of pickup roller drive component 117, taking up original(s) from original tray 22, and controls driving of original feed/transport drive motor 111 by way of original feed/transport drive motor control board 114, causing original(s) to be transported with accurate timing (step S4). As a result, the first original sheet is taken up from original tray 22, is transported along first and second original transport paths 32, 35, is made to pass between first and second capturing components 10, 23, and is discharged into discharge tray 3. During the course of this transport, images of both sides of the first original sheet are captured by first and second capturing components 10, 23 (step S5), the images of both sides of this original are processed by first and second image processing units 121, 122, and these images are stored in the form of respective sets of image data at first and second image memories 151, 152 (step S6).

Furthermore, in the event that the apparatus is directed to operate in single-sided capturing mode as described above, when respective data comparison processing units 136, 146 are directed to identify the front and the back of the first original sheet, results of identification of the front and back of the first original sheet are communicated from respective data comparison processing units 136, 146 to capturing controller 105. Note, however, that when the apparatus is directed to operate in double-sided capturing mode, this identification of the front and back of the first original sheet by respective data comparison processing units 136, 146 is not carried out.

Next, when the apparatus has been directed to operate in single-sided capturing mode ("Yes" at step S7), capturing controller 105 determines whether the results of identification performed by data comparison processing unit 136 are indicative of the back of the original and whether the results of identification performed by data comparison processing unit 146 are indicative of the front of the original, i.e., whether the side of the original which faces downward and which was captured by first capturing component 10 is the back thereof and whether the side of the original which faces upward and which was captured by second capturing component 23 is the front thereof (step S8). If, for example, the side of the original which faces downward is the back thereof, and the side of the original which faces upward and which was captured by second capturing component 23 is the front thereof ("Yes" at step S8), capturing controller 105 might output, to external equipment 161, image data present within second image memory 152, i.e., image data representing an image of the side of the original which faces upward (step S9).

In addition, prior to commencement of capturing of the second and any subsequent originals, capturing controller 105 would turn OFF exposing lamp 50 of first capturing component 10 and would stop first capturing component 10 from performing further capturing operations, but would enable continued performance of capturing operations by second capturing component 23 (step S10). Furthermore, capturing controller 105 would increase the illuminance produced by the exposing lamp of second capturing component 23 to a preestablished level. The reason for this is that during capturing of the first original sheet, the exposing lamps of both the first and the second capturing components 10, 23 being turned ON and the original being illuminated by two exposing lamps, the two surfaces thereof—the original having some nonzero translucency—will tend to be brighter, but during capturing of the second and any subsequent original sheets, one of the exposing lamps being turned OFF and the original being illuminated by the other of the exposing lamps, i.e., the exposing lamp which is not turned OFF, the surface of the original will tend to be darker, or at least this would be the case if the illuminance of the exposing lamp were not changed as is proposed herein. If the illuminance produced by the exposing lamp of second capturing component 23 is increased to a preestablished level prior to commencement of capturing of the second and any subsequent original sheets, it will be possible to make the image(s) of the second and any subsequent original sheets similar in brightness to the image(s) of the first original sheet. Furthermore, if exposing lamp 50 of first capturing component 10 is turned OFF prior to commencement of capturing of the second and any subsequent original sheets, even where turning OFF supply of power to this exposing lamp 50 might cause fluctuation in voltage or the like, producing variation in the illuminance produced by the exposing lamp of second capturing component 23, this can be accomplished without causing any adverse effect on capturing of the second and any subsequent original sheets as a result thereof.

Moreover, capturing controller 105 determines whether a second and any subsequent original sheets is or are present in original tray 22 based on output of detection by original sensor 43 (step S11), and if a second and any subsequent original sheets is or are present therein ("Yes" at step S11), the second original sheet is taken up from original tray 22, an image of the upward-facing side of this original is captured by second capturing component 23, and the image is first stored at second image memory 152 and is then output to external equipment 161 (step S12). Where the second and subsequent original sheets comprise a plurality of original sheets, these originals are consecutively taken up therefrom and are transported, images of the upward-facing sides of these originals are sequentially captured by second capturing component 23, and these images are sequentially output to external equipment 161 by way of second image memory 152.

Note that there is no objection to capturing images of all of the respective originals in original tray 22 and storing same in second image memory 152 before outputting said images of respective originals to external equipment 161. Furthermore, because in the situation where the upward-facing sides of the respective originals are captured, the first page among the respective originals will be topmost in original tray 22 and the last page thereamong will be bottommost therein, respective originals will be consecutively taken up therefrom starting with the first page and ending with the last page, images of the respective originals being sequentially stored at second image memory 152. For this reason, if images of all of the respective originals in original tray 22 are first captured and are stored at second image memory 152, and if images of respective originals are then retrieved from second image memory 152 and are output to external equipment 161 in the same order as the order in which they were stored, it will be possible to sequentially output images of respective originals starting with the first page and ending with the last page. Moreover, in the situation where images of the upward-facing sides of the respective originals are captured, because there is no capturing of images of downward-facing sides of respective originals and storing of same at first image memory 151, there is no objection to making first image memory 151 serve the additional role of providing storage for images of upward-facing sides of respective originals. This will make it possible to store a greater number of images.

Furthermore, if the results of identification performed by data comparison processing unit 136 are indicative of the front of the original and if the results of identification performed by data comparison processing unit 146 are indicative of the back of the original, i.e., if the side of the original which faces downward and which was captured by first capturing component 10 is the front thereof and if the side of the original which faces upward and which was captured by second capturing component 23 is the back thereof ("No" at step S8 and "Yes" at step S21), capturing controller 105 might output, from first image memory 151 to external equipment 161, image data representing an image of the side of the original which faces downward (step S22). In addition, prior to commencement of capturing of the second and any subsequent originals, capturing controller 105 would turn OFF the exposing lamp of second capturing component 23 and would stop second capturing component 23 from performing further capturing operations, but would enable continued performance of capturing operations by first capturing component 10 (step S23). At such time, capturing controller 105 increases the illuminance produced by exposing lamp 50 of first capturing component 10 to a preestablished level, making the image(s) of the second and any subsequent original sheets similar in brightness to the image(s) of the first original sheet.

Moreover, if capturing controller 105 determines that a second and any subsequent original sheets is or are present in original tray 22 based on output of detection by original sensor 43 ("Yes" at step S24), the second original sheet is taken up from original tray 22, an image of the downward-facing side of this original is captured by first capturing component 10, and the image is first stored at first image memory 151 and is then output to external equipment 161 (step S25). Where the second and subsequent original sheets comprise a plurality of original sheets, these originals are consecutively taken up therefrom and are transported, images of the downward-facing sides of these originals are sequentially captured by first capturing component 10, and these images are sequentially output to external equipment 161 by way of first image memory 151.

Note that there is no objection to capturing images of all of the respective originals in original tray 22 and storing same in first image memory 151 before outputting said images of respective originals to external equipment 161. Furthermore, because in the situation where images of the downward-facing side of the originals are captured, the last page among the respective originals will be topmost in original tray 22 and the first page thereamong will be bottommost therein, respective originals will be consecutively taken up therefrom starting with the last page and ending with the first page, images of the respective originals being sequentially stored at first image memory 151. For this reason, if images of all of the respective originals in original tray 22 are first captured and are stored at first image memory 151, and if images of respective originals are then retrieved from first image memory 151 and are output to external equipment 161 in the reverse order as the order in which they were stored, it will be possible to sequentially output images of respective originals starting with the first page and ending with the last page. Moreover, in the situation where images of the downward-facing sides of the respective originals are captured, because there is no capturing of images of upward-facing sides of respective originals and storing of same at second image memory 152, there is no objection to making second image memory 152 serve the additional role of providing storage for images of downward-facing sides of respective originals. This will make it possible to store a greater number of images.

Furthermore, if the results of identification by respective data comparison processing units 136, 146 match ("No" at step S8 and "No" at step S21), i.e., if results of identification would appear to indicate that the two sides of the original are both front sides or would appear to indicate that the two sides of the original are both back sides, capturing controller 105 might cause a message such as "Unable to proceed with capturing of originals" to be displayed at a display screen (not shown) and might cause transport and capturing of originals to be aborted (step S41).

Accordingly, when in single-sided capturing mode, images of both sides of the first original sheet are captured by first and second capturing components 10, 23, the front side of this original is identified based on images of both sides of this original, and only images of front sides of the second and any subsequent original sheets are captured by either the first or the second capturing components 10, 23, capturing by the other of the first and the second capturing components 10, 23 being stopped and the exposing lamp of this other of the first and the second capturing components 10, 23 being turned OFF.

Next, if the apparatus is directed to operate in double-sided capturing mode ("No" at step S7), capturing controller 105 might output, to external equipment 161, respective sets of image data present within first and second image memories 151, 152, i.e., image data representing images of both sides of the original(s) (step S31). In addition, until there are no more originals in original tray 22, capturing controller 105 might take up and transport originals from original tray 22, cause images of both sides of the originals to be captured by first and second capturing components 10, 23, and output images of both sides of the originals to external equipment 161 by way of first and second image memories 151, 152 (step S32). Note that images of all of the respective originals in original tray 22 may be captured and may be stored at first and second image memories 151, 152 before outputting all of said images of respective originals to external equipment 161.

Thus, in accordance with the present embodiment, when in single-sided capturing mode(s), because image(s) of both sides of first original sheet(s) is or are captured by first and second capturing components 10, 23, front side(s) of the original(s) being identified based on the image(s) of both sides of the original(s), and either first or second capturing component 10, 23 being used to capture only image(s) of front side(s) of second and any subsequent original sheet(s), front side(s) of respective original(s) may be captured regardless of whether front side(s) of respective original(s) in original tray 22 face upward or downward. Furthermore, because during capturing of second and any subsequent original sheet(s), capturing of back side(s) of original(s) by whichever of first and second capturing components 10, 23 is or are not engaged in capturing is aborted, lamp(s) for exposure belonging to this or these capturing components being turned OFF, reduction in power consumption is permitted.

Moreover, a great many variations of the present invention being possible, the invention is not to be limited by the foregoing embodiments. For example, during capturing of the second and any subsequent original sheets, not only is it possible to turn OFF the exposing lamp of either the first or the second capturing component 10, 23, but supply of power to either the first or the second image processing unit 121, 122 may be turned OFF. This will permit greater reduction in power consumption. Furthermore, whereas in the foregoing embodiments the illuminance of the exposing lamp of the capturing component that captures the second and any subsequent original sheets is increased, making the images of the second and any subsequent original sheets similar in brightness to the image(s) of the first original sheet, there is no objection to instead first capturing images of the second and any subsequent original sheets and thereafter using image processing to correct the brightness of the captured images. Or the image(s) of the first original sheet may be captured and image processing may be used to correct the brightness of the captured image(s), making the image(s) of the first original sheet similar in brightness to the images of the second and any subsequent original sheets. Furthermore, images of both sides of a plurality of original sheets may be captured, front sides of respective originals may be identified based on images of both sides of the respective originals, and, for the next and any subsequent original sheets, either the first or the second capturing component 10, 23 may be used to capture only the images of the front sides of the originals. This will make it possible to more definitively identify the front sides of the respective originals. Note however that time will be required for identification processing and power consumption will increase to the extent that more time is spent in double-sided capturing mode.

The present invention may be embodied in a wide variety of forms other than those presented herein without departing from the spirit or essential characteristics thereof. The foregoing embodiments and working examples, therefore, are in all respects merely illustrative and are not to be construed in limiting fashion. The scope of the present invention being as indicated by the claims, it is not to be constrained in any way whatsoever by the body of the specification. All modifications and changes within the range of equivalents of the claims are moreover within the scope of the present invention.

Moreover, the present application claims right of benefit of prior filing date of Japanese Patent Application No. 2002-138693, the content of which is incorporated herein by reference in its entirety. Furthermore, all references cited in the present specification are specifically incorporated herein by reference in their entirety.

What is claimed is:

1. In the context of an image capturing apparatus, equipped with one or more first and one or more second capturing means capable of capturing both sides of one or more originals, which is capable of using at least one of the first and at least one of the second capturing means to selectively execute operations either in one or more single-sided capture modes wherein one side of each of one or more originals is captured or in one or more double-sided capture modes wherein both sides of each of one or more originals are captured, an image capturing apparatus characterized in that it is equipped with one or more control means capable of causing, when executing operations pursuant to selection of at least one of the single-sided capture mode or modes, at least one of the first and at least one of the second capturing means to capture at least a portion of both sides of at least a first original sheet; at least one of the first or at least one of the second capturing means being selected based on the results of the capturing which was performed by at least one of the first and at least one of the second capturing means; and whichever of the first and second capturing means was selected being used to capture only one side of the next and any subsequent original sheets.

2. An image capturing apparatus according to claim 1 characterized in that supply of power to whichever of the first and second capturing means was not selected is turned OFF.

3. An image capturing apparatus according to claim 1 characterized in that at least one of the first and at least one of the second capturing means are each equipped with one or more light sources for irradiating one or more originals with light; and supply of power to at least one of the light source or sources of whichever of the first and second capturing means was not selected is turned OFF.

4. An image capturing apparatus according to claim 2 or 3 characterized in that the turning OFF of supply of power occurs during the period from completion of capturing of at least a portion of both sides of at least the first original sheet to the start of capturing of one side of the next and any subsequent original sheets.

5. An image capturing apparatus according to claim 1 characterized in that correction of capturing by at least one of the first and at least one of the second capturing means is carried out either when operations are being performed by at least one of the first and at least one of the second capturing means or when operations are being performed by at least one of the first or at least one of the second capturing means.

6. An image capturing apparatus according to claim 1 characterized in that, when operations are being performed by at least one of the first or at least one of the second capturing means, correction of capturing by whichever of the first and second means is performing operations is carried out.

7. An image capturing apparatus according to claim 5 or 6 characterized in that at least one of the first and at least one of the second capturing means are each equipped with one or more light sources for irradiating one or more originals with light; and the correction of capturing by at least one of the first and at least one of the second capturing means is accomplished at least partially through correction of one or more amounts of light from at least one of the light source or sources of each.

8. An image capturing apparatus according to claim 5 or 6 characterized in that the correction of capturing by at least one of the first and at least one of the second capturing means is accomplished at least partially through correction of one or more images of one or more originals captured by at least one of the first and at least one of the second capturing means.

9. An image capturing apparatus according to claim 1 characterized in that it is equipped with one or more first and one or more second storage means capable of storing one or more images of one or more originals;

at least one image of at least one original captured by at least one of the first capturing means being stored in at least one of the first storage means and at least one image of at least one original captured by at least one of the second capturing means being stored in at least one of the second storage means when in at least one of the double-sided capture mode or modes; and at least one of the first and at least one of the second storage means being used to store at least one image of at least one original captured by either at least one of the first or at least one of the second capturing means when in at least one of the single-sided capture mode or modes.

10. An image capturing apparatus according to claim 1 characterized in that it is equipped with one or more storage means capable of storing one or more images of a plurality of originals;

at least one of the respective image or images of originals captured by either at least one of the first or at least one of the second capturing means being sequentially stored in at least one of the storage means when in at least one of the single-sided capture mode or modes; and when retrieving at least one of said respective image or images of originals from at least one of the storage means, an order of retrieval of said respective image or images of originals being capable of being switched between an order in which said respective image or images of originals were stored and the reverse of the order in which said respective image or images of originals were stored, in accordance with whether it was at least one of the first or at least one of the second capturing means that captured same.

* * * * *